United States Patent Office 3,313,383
Patented Apr. 11, 1967

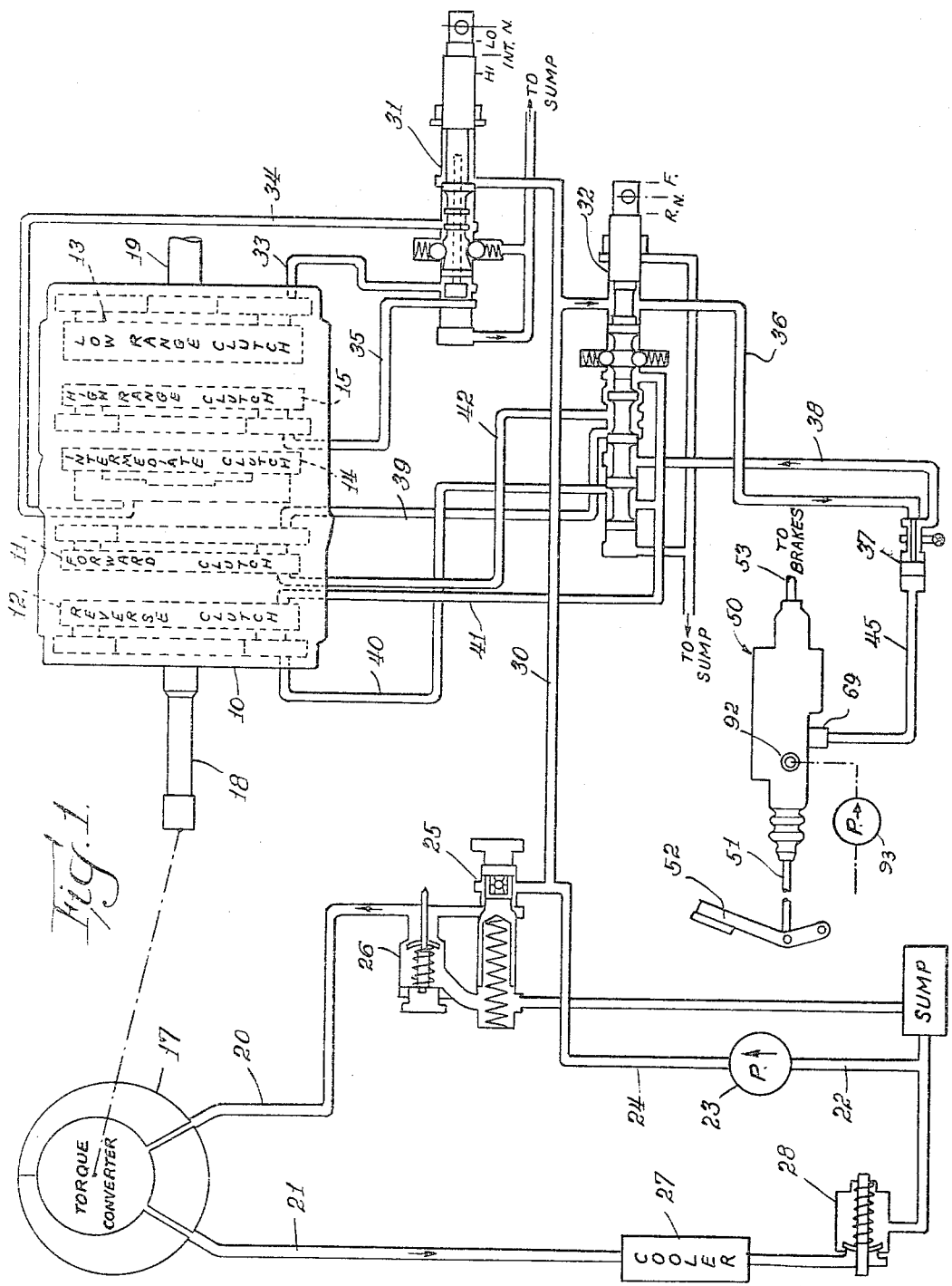

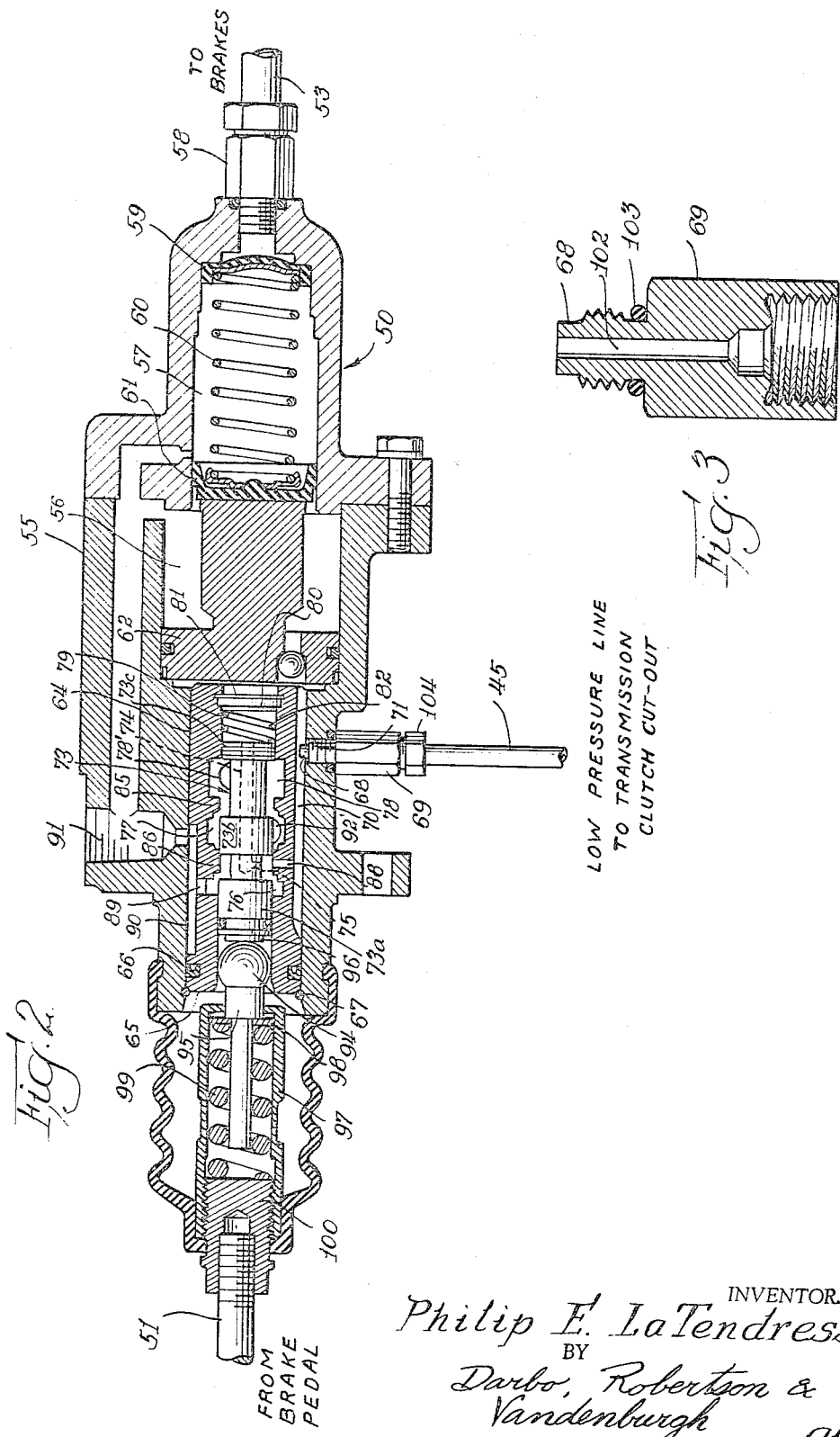

3,313,383
APPARATUS FOR APPLYING BRAKES AND
RELEASING TRANSMISSION CLUTCHES
OF VEHICLES
Philip E. La Tendresse, Baraga, Mich. 49908
Filed Feb. 2, 1965, Ser. No. 429,782
2 Claims. (Cl. 192—4)

The present invention relates to apparatus for a vehicle having hydraulic brakes and an automatic transmission and is for the purpose of releasing the clutch on the automatic transmission in a desired coordination with the application of the brakes on the vehicle. According to the desired coordination, the brakes should be in engagement substantially when the clutch is released. To achieve this dependably, it is sometimes necessary that the clutch release be delayed, or at least be prevented from operating too fast.

In one type of automatic transmissions, as illustrated by the Allison Torqmatic transmission, the transmission consists of a torque converter coupled to planetary gearing, which planetary gearing is controlled by hydraulic clutches. The purpose of the gearing and clutches is to provide a variety of ranges of operation as well as forward and reverse. By engaging a particular clutch a drive is obtained through a certain segment of the gearing to give a particular range of operation. The clutches are operated hydraulically under the control of a selector valve or valves.

Transmissions of this type have been provided with a clutch cutoff valve adapted to be operated by the hydraulic or air pressure to the brake cylinders for the purpose of disengaging the clutches of the transmission when the brakes are applied. The function of this valve is to shut off the flow of clutch operating oil so that the clutches are rendered inoperative. While it was intended that this valve be actuated by the fluid in the high pressure line to the brake cylinders, this did not always give the desired coordinated action between the application of the brakes and the operation of the clutch. This problem was alleviated by the present applicant in some prior art devices which used a master cylinder connected to a vacuum booster (e.g. Hydrovac) by taking off oil in the lower pressure line between the master cylinder and the vacuum booster to operate the clutch cutoff valve on the automatic transmission. This proved eminently satisfactory in those vehicles employing a vacuum-type booster.

However, this solution was not apparently applicable to the problem of obtaining the desired coordination of action between the brakes and the hydraulic clutch operation in vehicles using certain other types of vehicle brake systems. Many vehicles use the power braking system wherein a hydraulic fluid is applied to a master cylinder apparatus which actuates the braking system. The braking fluid pressure is under the control of a valving apparatus actuated by the brake pedal and which controls the supplied hydraulic fluid. One form of such a system is illustrated by the Bendix power brake valve assembly #610965 intended for use in a vehicle having power steering as well as power brakes. Through the use of the present invention such a power brake valve or master cylinder apparatus may be employed to control the clutches of an automatic transmission, while at the same time achieving the desired coordination that is not obtained when the clutch control valve is actuated as heretofore, by the high pressure in the brake lines to the wheel cylinders.

Further objects and advantages will become apparent from the following description taken in conjunction with the drawings in which:

FIGURE 1 is a schematic illustration of an automatic transmission using fluid operated clutches and a brake master cylinder apparatus or power brake valve;

FIGURE 2 is a section through the power brake valve of FIGURE 1; and

FIGURE 3 is a section through an adapter fitting employed in the disclosed embodiment of the present invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

*Background: automatic transmission*

The automatic transmission illustrated in FIGURE 1 primarily shows the main hydraulic system thereof. It comprises a gear case 10 within which are the planetary gearing systems (not shown) for the various speed ranges as well as forward and reverse. The forward gearing system is controlled by clutch 11 while the reverse drive gearing system is controlled by clutch 12. Three speed ranges are provided, a low, intermediate and high, controlled by clutches 13, 14 and 15 respectively. The torque converter 17 is mounted on the input shaft 18 of the planetary gear apparatus. Shaft 19 is the output shaft thereof.

Pipe 20 represents the oil supply pipe to the pump of the torque converter 17, while pipe 21 represents the oil discharge from the turbine of the torque converter. Oil is fed to pipe 20 from a sump from which it is withdrawn through pipe 22 by a pump 23 and thence through a pipe 24, a main pressure regulator valve 25 and past a converter relief valve 26 to pipe 20. From pipe 21 the oil goes through an oil cooler 27 and a lubrication pressure regulator valve 28 to the sump.

From pipe 24 oil flows through a pipe 30 to a range selector valve 31 and to a forward and reverse selector valve 32. Depending upon the setting of the range valve 31, oil is directed either through pipe 33 to low range clutch 13, through pipe 34 to the intermediate range clutch 14 or through pipe 35 to the high range clutch 15. The oil entering valve 32 from pipe 30 is transferred to a pipe 36 to the clutch cutoff valve 37 and from the clutch cutoff valve 37 back to selector valve 32 through a pipe 38. Depending upon the setting of valve 32, oil from pipe 38 is directed either through a pipe 39 to forward clutch 11 or through a pipe 40 to reverse clutch 12. Pipes 41 and 42 are lubrication lines and have no significance insofar as the present invention is concerned.

Clutch cutoff valve 37 is operated by fluid pressure supplied thereto through a pipe 45. The makers of the transmission intended that pipe 45 to connected to the brake line leads to the wheel cylinders, e.g. to line 53. Thus when the brakes were applied the fluid pressure to the wheel cylinders also was directed through pipe 45 to valve 37 closing the valve. This shut off the flow of oil between pipes 36 and 38. With no oil being supplied to the forward or reverse clutch (as the case might be, depending upon the setting of valve 32), the then engaged clutch would disengage, seepage to pipes leading back to the sump not being entirely shut off. This would permit the engine of the vehicle to be run at normal operating speed to perform other functions while at the same time not imposing an undue load on torque converter 17 since both of clutches 11 and 12 would then be disengaged. This operation of clutches 11 and 12 worked satisfactorily so long as the vehicle was stopped at a level spot. However, it was found that when the vehicle was standing on an incline, clutch disengagement occurred too rapidly so that the vehicle would slip before the brakes took hold.

Background: cylinder apparatus

A master cylinder apparatus or power brake valve device generally 50 is provided for power brake operation. It has an actuating rod 51 connected to be manually moved by the operation of a brake pedal 52. Hydraulic fluid is supplied to the wheel cylinders to operate the brakes through a pipe 53.

The structure and operation of the master cylinder apparatus is best seen with reference to FIGURE 2. It comprises a body or housing 55 within which is a dual bore forming a large cylinder 56 and a small cylinder 57. Brake line 53 connects to and communicates with the end of small cylinder 57 through fittings 58. A residual valve 59 is mounted in that end of cylinder 57. A compression spring 60 is received between residual valve 59 and a synthetic rubber piston 61. In effect, piston 61 is part of a dual piston device having a large piston 62 at the other end thereof and received in large cylinder 57. The effective area of piston 62 is twice that of piston 61.

A bore 64 in body 55 is coaxial with cylinder 56 and receives a manual brake actuating sleeve 65. Sleeve 65 is axially movable in bore 64 and has a seal ring 66 adjacent the end thereof. A snap ring 67 seated in a groove in body 55 limits the movement of sleeve 65 to the left in FIGURE 2. Rotational movement of sleeve 65 in bore 64 is prevented by means of the protruding alignment pin 68 of a fitting 69 which extends into a longitudinal groove or passageway 70 in the sleeve and is received in a tapped opening 71 in body 55. Heretofore, the alignment pin 68 has been the tip of a screw plug.

Sleeve 65 has a central longitudinal opening in which is received a pressure regulating spool 73 having three annular portions 73a, 73b and 73c respectively. An axial opening or bore 74 extends inwardly from the right end of the spool about half the length of the spool. An orifice 75 extends from axial opening 74 to the periphery of the spool between portions 73a and 73b.

The opening in which spool 73 is received defines four chambers to wit, a discharge or return chamber 76, an intake chamber 77, a power steering chamber 78 and a reaction chamber 79. A disc 80 held in place by a snap ring 81 closes the end of the internal opening and defines an end of reaction chamber 79. A compression spring 82 is received in reaction chamber 79 between disc 80 and the adjacent end of the spool 73. Sleeve 65 defines a land 85 between chambers 77 and 78 and a land 86 between chambers 76 and 77.

A radial bore 88 extends through land 86 to slot 70. A radial bore 89 extends from chamber 76 to a longitudinal slot 90 which in turn communicates with a discharge connection 91 in body 55. In a similar fashion an external fluid feed connection 92 (FIG. 1) communicates with chamber 77 through a radial bore 92' (shown at a different angle in FIG. 2 for illustration) through sleeve 65 and a longitudinal slot (not shown) on the periphery of sleeve 65. Also likewise, a power steering connection communicates with chamber 78 through another radial bore 78' and axial slot (not shown) in sleeve 65. In the actual valve these radial bores 92' and 78' (illustrated at odd angles) are displaced 90° in opposite directions from bore 89. In each instance they and their connected slots correspond to bore 89, slot 90 and connection 91 except for their positioning as described. The input feed connection 92 is shown in its correct position in FIGURE 1, and is connected to the output of a pump 93. The power steering connection is on the back side of the apparatus 50 of FIGURE 1 and if dotted would be immediately behind the lines of connection 92.

A ball end 94 of a pressure regulating rod 95 contacts end 96 of spool 73. Rod 95 extends into a sleeve 97 and bears against a washer 98 which is seated on an end of regulating spring 99. The other end of spring 99 is seated against a plug 100 onto which sleeve 97 is threaded.

Background: brake operation

FIGURE 2 illustrates the position of the apparatus before the brake pedal has been depressed. Assuming that the master cylinder apparatus and brake lines are full of oil and that oil under pressure is being supplied to chamber 77 through connection 92 and passage 92', the operation is as follows. Pressure applied to foot pedal 52 moves pressure regulating rod 95 to the right and correspondingly moves spool 73 to the right. Portion 73a of the spool approaches land 86 to at least partially shut off communication to discharge chamber 76.

At the same time portion 73b leaves land 86 to open communication at the left side of pressure chamber 77. Oil flows from pressure chamber 77 into the space centrally of land 86 and through radial opening 88 to slot 70. This oil enters the end of cylinder 56 to apply pressure on piston 62, on its left face, as shown. Piston 62 is moved to the right so that piston 61 applies a substantially higher pressure to the oil in cylinder 57. With the areas of pistons 61 and 62 as previously described, the oil in cylinder 57 is twice the pressure of that in the left end of cylinder 56. This pressure is applied to the brakes through pipe 53.

At the same time the oil is metered through orifice 75 to axial opening 74 and into reaction chamber 79. This oil acts against the end of annulus 73c as a piston and applies a force to spool 73 in opposition to that of spring 99. The various opposing forces adjust the position of spool 73 in sleeve 65 to provide a valving of oil such that the desired braking pressure is maintained. If oil pressure fails, or in case of very forceful pressing of brake pedal 52, sleeve 97 is thrust against sleeve 65, which in turn is thrust against piston 62, to move piston 61 to the right and supply or add manual braking pressure.

Coordinated transmission and brake control

As previously mentioned, the prior practice in the use of the master cylinder 50 has been to use the braking pressure through pipe 53 to operate the clutch cutoff valve 37. This did not give the desired coordination, which includes a slight lag in the operation of the clutch cutoff valve. In spite of the achievement of the desired coordination with other systems, the experts have seen no ready way to achieve it with the prior art master cylinders of the general type illustrated.

According to the present invention reanalysis of the internal nature of master cylinder 50 has shown that the desired coordination can be achieved with the utmost ease. All that turns out to be necessary is to replace the alignment screw which formerly carried the alignment pin 68 with the fitting 69 and connect this to the clutch cutoff valve 37. It happens that the various forces acting on sleeve 65 and core 73 perform a valving function which provides, in slot 70, a pressure suitable for operating the clutch cutoff valve 37 with the desired coordination or lag as compared to application of the brakes, and with the desired late clutch engagement when the brakes are released.

On retrospect, it is apparent that this must be so, during those times of operation when this coordination is needed. The needed lag is when the brakes are being applied slowly. With quick full action of the brakes, simultaneous actuation of the clutch, without lag, is acceptable. With slow actuation of brakes by master cylinder 50, sleeve 97 will not reach, or will not be thrust hard against sleeve 65, and the pressure of fluid on the left face of piston 62 is necessarily equal to, or (if sleeve 97 bears lightly on sleeve 65) nearly equal to, one-half the braking pressure. This same one-half or nearly one-half pressure is in slot 70. Accordingly, in the present invention it is this pressure which is transmitted through substituted fitting 69 and pipe 45 to clutch cutoff valve 37. If the brakes are slowly released, no more than half the pressure effective in the brake line can be applied to the clutch cutoff valve, and hence it will restore clutch engagement before the brakes are fully off.

Fitting 69 has an axial bore 102. It is threaded into place in body 55 and sealed by an O-ring 103. The external end is suitably formed to receive the flared end on tubing or pipe 45 held in place by a sealing nut 104.

Thus, some of the oil flowing along slot 73 toward cylinder 56 to operate piston 62 flows instead through bore 102 of fitting 69 to pipe 45 to actuate clutch cutoff valve 37 as previously described. It will be noted that the oil pressure in slot 70 (and thus the oil pressure at clutch cutoff valve 37) is substantially less than (one-half in the described embodiment) the oil pressure in brake lines 53. It has been discovered that this gives, quite satisfactorily, the desired operation of the clutch disengagement in relation to the brake application.

I claim:

1. A master cylinder apparatus for use in operating the hydraulic brakes and the hydraulically operable clutch operating means of the transmission of a vehicle, said apparatus including: a master cylinder body having a hydraulic fluid supply connection, a clutch connection for connection to the clutch operating means, a fluid cylinder comprising a large bore and a small bore aligned with each other, and a brake line connection through which the fluid pressure in the small bore can be transmitted to the brakes; piston means in the fluid cylinder whereby fluid pressure applied to one end of the large bore produces an increased pressure applied to the opposite end of the small bore; a passageway in the body communicating with said one end of the large bore and with said clutch connection; slide valve means in said body and including a manually operable spool, said valve means communicating with said supply connection and with said passageway to supply fluid to said passageway in response to the manual actuation of the spool; said clutch connection, when pressure has been applied through it to the clutch operating means, being free for return flow to cause reengagement of the clutch if the brake pedal is in the fully released position and mechanical means operated in conjunction with the valving means for actuating the piston means mechanically independently of the fluid actuation thereof.

2. A master cylinder apparatus for use in operating the hydraulic brakes and the hydraulically operable clutch operating means of the transmission of a vehicle, said apparatus including: a master cylinder body having a hydraulic fluid supply connection, a clutch connection, a fluid cylinder, a brake line connection leading from one end of the cylinder through which the fluid pressure can be transmitted to the brakes; piston means in the fluid cylinder, valving means controlled primarily manually for admitting fluid pressure to the cylinder beyond the piston means from the brake line connection, and a clutch connection for connection to the clutch operating means connected between the valving means and the cylinder; the cylinder and piston means being of substantially greater diameter on the side subjected to the fluid pressure supply than on the side toward the brake line connection, whereby the pressure at the clutch connection is substantially less than that at the brake line connection; said clutch connection, when pressure has been applied through it to the clutch operating means, being free for return flow to cause reengagement of the clutch if the brake pedal is in the fully released position; and mechanical means operated in conjunction with the valving means for actuating the piston means mechanically independently of the fluid actuation thereof.

References Cited by the Examiner
UNITED STATES PATENTS

| | | | |
|---|---|---|---|
| 3,017,974 | 1/1962 | Lasley | 192—4 |
| 3,050,165 | 8/1962 | Day et al. | 192—4 X |

DAVID J. WILLIAMOWSKY, *Primary Examiner.*

BENJAMIN W. WYCHE III, *Examiner.*